Dec. 13, 1955     L. C. GALLI     2,726,794
CONTAINERS INCORPORATING MEASURING AND DISPENSING MEANS
Filed July 7, 1952
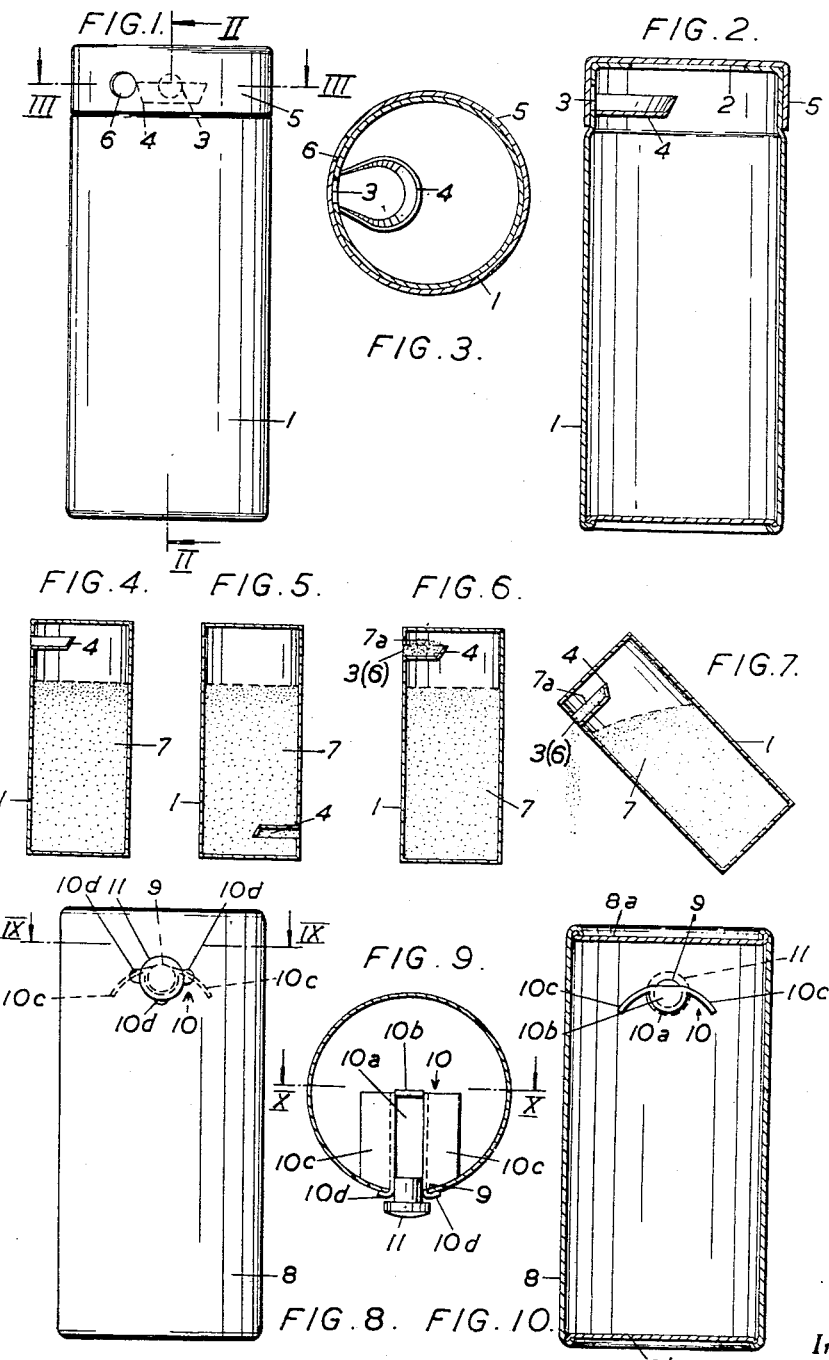
Inventor
*L. C. Galli*
By
*Wenderoth, Lind & Ponack*
Attorneys United States Patent Office 2,726,794
Patented Dec. 13, 1955

2,726,794

CONTAINERS INCORPORATING MEASURING AND DISPENSING MEANS

Leon Clement Galli, Auckland, Auckland, New Zealand

Application July 7, 1952, Serial No. 297,440

Claims priority, application New Zealand February 8, 1952

2 Claims. (Cl. 222—456)

The invention relates to containers for flowable material.

One of the objects of the invention is to provide a container incorporating, as part of its construction, measuring and dispensing means, the container nevertheless remaining of simple form.

A further object of the invention is to provide a container which is particularly suitable for use where it is required frequently to dispense measured quantities of flowable material, be the latter in liquid, granulated or powdered form, as for example when dispensing medicinal doses or measures of flowable material required for use in the home or kitchen.

A still further object of the invention is to provide a container which not only incorporates measuring and dispensing means, but is otherwise so constructed as to keep its contents in good condition and free from contamination.

A container constructed in accordance with the invention comprises a receptacle for flowable material, an outlet opening provided in the receptacle near thereof, and a device mounted within the receptacle at a position situated adjacent the outlet opening and adapted to receive a portion of the material contained within the receptacle and to hold said portion in such a manner that the portion will flow through the outlet opening when the receptacle is tilted.

The receptacle may include means for normally closing the outlet opening or a separate closure may be provided for the purpose.

Reference is now made to the accompanying drawings which illustrate two forms of containers constructed in accordance with the invention and suitable for use in dispensing powdered or granular material. In the drawings:

Figure 1 is a side elevational view of the first form of container;

Figure 2 is a vertical sectional view on the line II—II of Figure 1;

Figure 3 is a sectional plan view on the line III—III of Figure 1;

Figures 4, 5, 6 and 7 are diagrammatic sectional views illustrating how a container constructed in accordance with Figures 1 to 3 is used;

Figure 8 is a side elevational view of the second form of container;

Figure 9 is a sectional plan view on the line IX—IX of Figure 8, and

Figure 10 is a vertical sectional view on the line X—X of Figure 9.

In the construction according to Figures 1 to 7, the container comprises a receptacle 1 of cylindrical form, fitted with a lid 2 (Figure 2) enabling the receptacle to be filled with the desired quantity of powder 7 (Figures 4 to 7), and then closed.

In the side wall of the receptacle there is formed a hole 3 arranged near the top of the receptacle and constituting an outlet opening.

Inside the receptacle there is provided a measuring vessel 4 of saucer-like or shallow cup-like form and of a superficial area which is less than the cross-sectional area of the receptacle 1. This vessel 4 is arranged horizontally and is suitably secured to the inside face of the side wall of the receptacle 1 (as by soldering where the receptacle is of metal and the vessel 4 is likewise of metal) at a position situated adjacent the outlet opening 3.

Around the upper part of the receptacle 1 there is provided a rotatable sleeve 5 having therein a hole 6 so positioned that when the sleeve is rotated relatively to the receptacle, the said hole 6 will be brought into register with the outlet opening 3 in the receptacle, thereby providing a passage from the inside to the outside of the receptacle, or will be brought out of register with the outlet opening 3, to thereby close the latter and thus seal the receptacle.

When initially supplying the receptacle with powder, the amount inserted should be such that the level of the powder 7 lies below the measuring vessel.

To use the container for measuring and dispensing a quantity of the powder, it is first seen that the sleeve 5 has been rotated to a position in which it acts to close the outlet opening 3 of the receptacle as depicted in Figures 1 to 4. The container is now inverted as indicated in Figure 5, and then returned to normal position, the result being that a part 7a of the powder 7 within the receptacle 1 will be caught up and held by the measuring vessel 4, while the remaining part of the powder will fall down to the bottom part of the receptacle as indicated in Figure 6. At this stage, the receptacle may be lightly tapped with the fingers to throw off any surplus powder held by the measuring vessel 4. The sleeve 5 is now rotated until the hole 6 therein comes into register with the outlet opening 3 in the receptacle 1. Thereupon the container is tilted so that the outlet opening faces downwardly, in consequence of which the part 7a of the powder 7 held by the measuring vessel 4 will spill therefrom through the outlet opening 3 and through the hole 6 in the sleeve 5 to the outside of the container as depicted in Figure 7.

One of the advantages of the construction of container according to Figures 1 to 7, is that it is unnecessary to remove the lid 2 of the receptacle 1 when it is desired to gain access to the contents, thereby avoiding exposure of the contents to the atmosphere which, in some cases, may have a deleterious effect on the material within the receptacle. Another advantage is that the material within the receptacle can not only be dispensed in measured quantities, but the measuring vessel 4 is always present when required as it forms part of the container. A still further advantage is that as the measuring vessel 4 is arranged within the receptacle, it is protected from being damaged.

If desired, the rotatable sleeve 5 may be dispensed with, the lid 2 of the receptacle 1 then being made to fit rotatably on the receptacle and having a skirt portion formed with a hole adapted to be brought into and out of register with the outlet opening in the receptacle, by rotation of the lid.

In the construction according to Figures 8 to 10, the container comprises a receptacle having a cylindrical body part 8 which is closed at the top and bottom as indicated at 8a and 8b in Figure 10.

Near the top, the side wall 8 of the receptacle is formed with a hole 9 providing an outlet opening. Initially, the receptacle can be filled to the desired extent with the powdered or granular material, by injecting the material through the outlet opening 9.

Inside the receptacle there is provided a measuring device which is suitably secured against the inside face of the side wall 8 of the receptacle at a position situated adjacent the outlet opening 9. The measuring device is in the form of a rectangular plate generally indicated at 10, lying substantially horizontally within the receptacle and having a superficial area which is less than the area of the cross-section of the receptacle. Thus, with one edge of the plate 10 butted against the inside face of the side wall of the receptacle, the remaining edges of the plate, as well as the upper and lower surfaces thereof, are surrounded by the free space within the receptacle. The plate 10 is formed with a trough 10a one end of which opens in register with the outlet opening, while the other end is closed as indicated at 10b. The trough extends centrally along the plate so as to leave wings 10c on each side, these wings being inclined or curved downwardly.

Where the measuring plate 10 and receptacle are of metal, the plate may be soldered in position in the course of manufacture of the container. Alternatively, and as shown in Figures 8 and 9 the edge of the plate 10 lying against the inner face of the side wall 8 of the receptacle may be formed with tongues 10d passing through the hole in the said side wall 8 (or through specially made slots in the side wall) and bent over.

When the container is not in use, the outlet opening 9 may be closed by a removable plug 11 which extends a short way along the length of the trough 10a in the measuring plate 10. Alternatively, the receptacle may be provided with a plate held slidably in position by flanges, the plate acting, in one position, to close the outlet opening 9 and, in another position, to uncover the opening.

The mode of using a container as described with reference to Figures 8 to 10 is similar to that described with reference to Figures 1 to 7. It is first seen that the outlet opening 9 is closed. Where a special closure, such as the plug 11, is not provided, a finger of the hand may be used to close the opening. The container is now inverted and then returned to normal position, the result being that a portion of the contents of the receptacle will be caught up by the measuring plate 10 so that the trough 10a therein will become filled, while the remainder of the contents will fall to the lower part of the receptacle. Surplus material lying on the wings 10c of the plate will be shed therefrom owing to the downward inclination or curvature of these wings. At this stage the receptacle may be lightly tapped to encourage the shedding of surplus material from the wings. The outlet opening 9 is now opened and the receptacle tilted so that the outlet opening faces downwardly, the consequence being that the material held in the trough 10c of the measuring plate 10 will flow therefrom through the outlet opening 9 so that it is dispensed as a particular quantity at the outside of the container.

One of the advantages of the construction according to Figures 8 to 10 is that it is unnecessary to provide the receptacle with a removable lid for access to the contents of the container. Thus, undue exposure of the contents of the receptacle to the atmosphere, which in some cases may be deleterious, is avoided. Moreover, in the dispensing operation, it is unnecessary to insert into the contents of the receptacle a spoon or scoop which may contaminate the contents. Another advantage is that portions of the material in the receptacle can not only be dispensed in measured quantities in a simple and speedy manner, but the measuring device is always present when required as it forms part of the container. A still further advantage is that as the measuring device is arranged within the receptacle it is protected against damage. The provision of the measuring device does not add materially to the cost of manufacture of the container, especially bearing in mind that the provision of a lid is not essential.

What I do claim and desire to obtain by Letters Patent of the United States of America is:

1. A container for granulated or powdered flowable material, comprising a receptacle having a side wall and closed upper and lower end walls, said side wall having an outlet opening in a position situated nearer the upper end wall than the lower end wall, and a measuring device secured within said receptacle comprising a plate having an area which is less than the area of the cross-section of the receptacle, said plate having formed centrally therein a trough having one end in communication with said outlet opening, the edges of said plate forming wings extending outwardly and downwardly from the side edges of said trough.

2. A container for comminuted flowable material, comprising a receptacle having a side wall and closed upper and lower end walls, said side wall having an outlet opening adjacent said upper end wall, a removable stopper for closing said outlet opening, and a measuring device comprising a plate secured within said receptacle and having a superficial area less than the area of the area of the cross-section of the receptacle, said plate being shaped to provide therein a horizontally centrally disposed trough having one end which opens in register with said outlet opening while the other end is closed and the edges of said plate forming wings curved outwardly and downwardly from the side edges of said trough.

References Cited in the file of this patent

UNITED STATES PATENTS

| | | |
|---|---|---|
| 856,543 | Nolan | June 11, 1907 |
| 978,988 | Cunningham | Dec. 20, 1910 |
| 2,006,019 | Holesworth | June 25, 1935 |
| 2,530,730 | Richter | Nov. 21, 1950 |